United States Patent
Nakashiba

(10) Patent No.: US 7,809,255 B2
(45) Date of Patent: Oct. 5, 2010

(54) SOLID STATE IMAGING DEVICE

(75) Inventor: Yasutaka Nakashiba, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 408 days.

(21) Appl. No.: 11/783,146

(22) Filed: Apr. 6, 2007

(65) Prior Publication Data

US 2007/0237504 A1 Oct. 11, 2007

(30) Foreign Application Priority Data

Apr. 11, 2006 (JP) .............................. 2006-108304

(51) Int. Cl.
G03B 29/00 (2006.01)
(52) U.S. Cl. ...................................... 396/15
(58) Field of Classification Search .................. 396/15; 382/124–125
See application file for complete search history.

(56) References Cited

U.S. PATENT DOCUMENTS

| | | | | |
|---|---|---|---|---|
| 6,234,031 | B1 * | 5/2001 | Suga | 73/862.474 |
| 6,310,683 | B1 * | 10/2001 | Fujiwara et al. | 356/71 |
| 7,598,483 | B2 * | 10/2009 | Uchida | 250/216 |
| 2002/0005906 | A1 | 1/2002 | Ohkabo et al. | |
| 2003/0063783 | A1 * | 4/2003 | Higuchi | 382/125 |
| 2003/0235329 | A1 * | 12/2003 | Komatsuzaki et al. | 382/124 |
| 2005/0036665 | A1 * | 2/2005 | Higuchi | 382/124 |
| 2006/0035060 | A1 * | 2/2006 | Koyama et al. | 428/141 |
| 2006/0050387 | A1 * | 3/2006 | Arakawa et al. | 359/491 |
| 2006/0067564 | A1 * | 3/2006 | Miyasaka | 382/124 |
| 2006/0082760 | A1 * | 4/2006 | Lin | 356/71 |
| 2006/0099726 | A1 * | 5/2006 | Ito et al. | 438/10 |
| 2006/0155913 | A1 * | 7/2006 | Nishikawa et al. | 711/100 |
| 2007/0160263 | A1 * | 7/2007 | Abiko et al. | 382/115 |

FOREIGN PATENT DOCUMENTS

| | | | |
|---|---|---|---|
| JP | 3-244092 | | 10/1991 |
| JP | 10-269342 | | 10/1998 |
| JP | 11-53523 | | 2/1999 |
| JP | 2000-217803 | | 8/2000 |
| JP | 2002-33469 | | 1/2002 |
| JP | 2002-74345 | | 3/2002 |
| JP | 2004-005005 | | 1/2004 |
| JP | 2004005005 | A * | 1/2004 |
| JP | 2004-246586 | | 9/2004 |

OTHER PUBLICATIONS

Chinese Patent Office issued a Chinese Office Action dated Jan. 23, 2009, Application No. 200710096043.4.

* cited by examiner

*Primary Examiner*—W. B. Perkey
*Assistant Examiner*—Dennis Hancock
(74) *Attorney, Agent, or Firm*—Young & Thompson

(57) ABSTRACT

The solid-state imaging device includes a semiconductor substrate and a light receiving portion. On the back surface of the semiconductor substrate a contact surface is provided. The solid-state imaging device photoelectrically converts, in the semiconductor substrate, light transmitted through the object to be imaged in contact with the contact surface, and receives the electric charge generated by the photoelectric conversion with the light receiving portion, to thereby acquire the image of the object to be imaged. The contact surface is a rough surface.

11 Claims, 4 Drawing Sheets

SOLID STATE IMAGING DEVICE

This application is based on Japanese patent application No. 2006-108304, the content of which is incorporated hereinto by reference.

BACKGROUND

1. Technical Field

The present invention relates to a solid-state imaging device, and more particularly to a solid-state imaging device used for imaging a fingerprint.

2. Related Art

Conventional solid-state imaging devices applicable to imaging a fingerprint can be found, for example, in Japanese Laid-open patent publications No. 2004-246586 (patent document 1), No. 2002-33469 (patent document 2), No. 2000-217803 (patent document 3), and No. 2002-74345 (patent document 4). The solid-state imaging devices disclosed in these documents include a contact surface on which a finger is to be placed, for shooting an image of the fingerprint of the finger placed on the contact surface.

In addition to the documents cited above, prior art literature relevant to the present invention includes Japanese Laid-open patent publications No. H03-244092 (patent document 5), No. H11-53523 (patent document 6), and No. H10-269342 (patent document 7).

SUMMARY OF THE INVENTION

In the foregoing solid-state imaging devices, however, a trace of the fingerprint (residual fingerprint) remains on the contact surface after shooting the image. Presence of such residual fingerprint which is visible with naked eyes provokes an uneasy sensation in the user of the solid-state imaging device, based on the fear that his/her fingerprint might be illegitimately acquired. Besides, in a solid-state imaging device in which the contact surface, with which the finger is brought to direct contact, is located on a back surface of a semiconductor substrate, impurity stuck to the finger often diffuses the semiconductor substrate, thereby degrading performance of a light receiving portion and MOSFET provided on the opposite side. This leads to degraded reliability of the solid-state imaging device.

According to the present invention, there is provided a solid-state imaging device, including: a semiconductor substrate; a light receiving portion provided in the semiconductor substrate; and a contact surface with which an object to be imaged is brought into contact, located on a back surface of the semiconductor substrate; wherein the contact surface is a rough surface; and light transmitted through the object to be imaged in contact with the contact surface is photoelectrically converted in the semiconductor substrate, so that the light receiving portion receives an electric charge generated by the photoelectric conversion, thereby acquiring an image of the object to be imaged.

In the solid-state imaging device thus constructed, the contact surface is a rough surface. Accordingly, after the object to be imaged, specifically a finger, is brought into direct contact with the contact surface, the residual fingerprint barely remains on the contact surface, unlike in the case where the contact surface is smooth. Also, the rough surface of the contact surface makes it difficult to recognize the residual fingerprint with naked eyes, thereby alleviating the uneasy sensation of the user.

Further, performing a surface treatment process, such as mechanical polishing, for roughening the contact surface incurs distortion on the contact surface due to the mechanical processing, which may offer an extrinsic gettering (hereinafter, EG) effect of capturing a metal or the like. The EG effect may, for example, prevent the impurity stuck to the finger from diffusing the semiconductor substrate, and from thereby degrading performance of a light receiving portion and MOSFET provided on the opposite side. The rough surface prevents, therefore, the degradation in reliability of the solid-state imaging device.

Thus, the present invention provides a solid-state imaging device that alleviates uneasy sensation of the user. Also, performing a surface treatment process, such as mechanical polishing, for making the contact surface rough enables preventing the impurity stuck to the finger from diffusing the semiconductor substrate, and from thereby degrading performance of a light receiving portion and MOSFET provided on the opposite side.

BRIEF DESCRIPTION OF THE DRAWINGS

The above and other objects, advantages and features of the present invention will be more apparent from the following description taken in conjunction with the accompanying drawings, in which.

DETAILED DESCRIPTION

Figure 1:
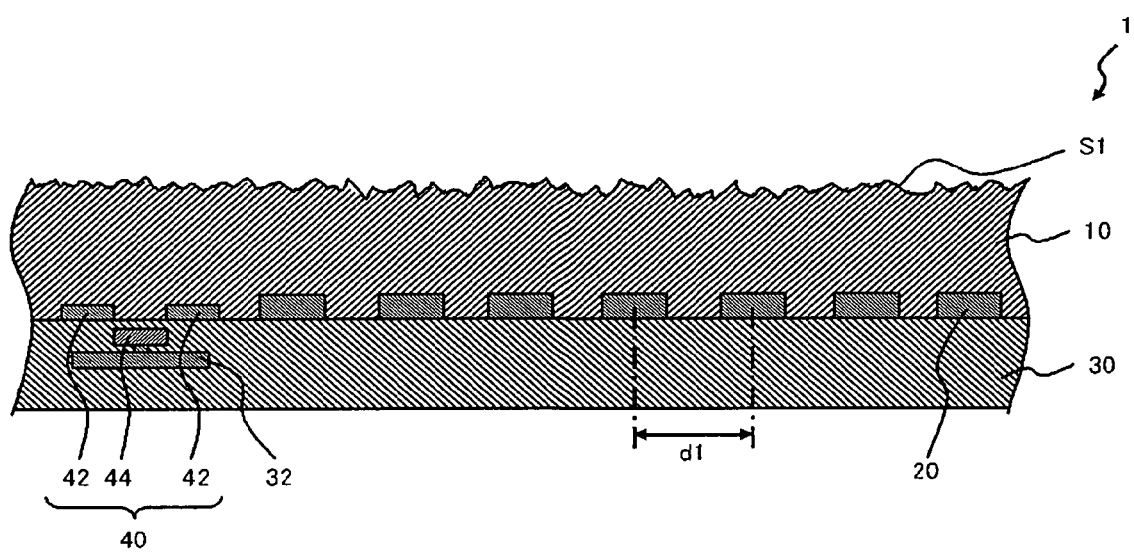
FIG. 1 is a cross-sectional view of a solid-state imaging device according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereunder, an exemplary embodiment of a solid-state imaging device according to the present invention will be described in details, referring to the accompanying drawings. In the drawings, same constituents are given the same numerals, and the description thereof will not be repeated.

FIG. 1 is a cross-sectional view of a solid-state imaging device according to an embodiment of the present invention. The solid-state imaging device 1 includes a semiconductor substrate 10 and a light receiving portion 20. In this embodiment, the semiconductor substrate 10 is a P-type silicon substrate. On the back surface of the semiconductor substrate 10 (opposite to an interconnect layer 30 to be subsequently described), a contact surface S1 is provided. The solid-state imaging device 1 photoelectrically converts light transmitted through an object to be imaged in direct contact with the contact surface S1 in the semiconductor substrate 10, and receives an electric charge generated by the photoelectric conversion with the light receiving portion 20, thereby acquiring an image of the object to be imaged.

The contact surface S1 is a rough surface. In other words, the contact surface S1 has undergone a roughening process such as a non-gloss processing or a mat finishing. Such roughening process may be executed by a surface treatment process such as mechanical polishing.

The semiconductor substrate 10 includes a plurality of the light receiving portions 20. To be more detailed, the light receiving portions 20 are provided in a superficial layer on the front surface of the semiconductor substrate 10. In this embodiment the light receiving portions 20 are N-type impurity diffusion layers. The light receiving portions 20 constitute a photodiode in collaboration with the adjacently located semiconductor substrate 10.

The semiconductor substrate 10 also includes a MOSFET 40. Thus, the solid-state imaging device 1 includes a combination of a MOS image sensor unit including the light receiving portions 20 and so on, and a logic circuit unit including the MOSFET 40 and so on. The MOSFET 40 includes an N-type impurity diffusion layer 42 that works as a source/drain region, and a gate electrode 44.

On the surface of the semiconductor substrate 10, an interconnect layer (an insulating layer including an interconnect) 30 is provided. The interconnect layer 30 includes an interconnect 32.

Preferably, in the solid-state imaging device 1, an average arrangement pitch of concave and convex portions of the contact surface S1 may be smaller than an average arrangement pitch of concave and convex portions of the fingerprint of the finger. More preferably, the former may be ½ of the latter or smaller. It is also preferable that an average height of the convex portions of the contact surface S1 is lower than an average height of the convex portions of the fingerprint of the finger. Further, it is preferable that the average arrangement pitch of the concave and convex portions of the contact surface S1 is smaller than the average arrangement pitch of the light receiving portions 20. In addition, it is preferable that the average arrangement pitch of the light receiving portions 20 is smaller than the average arrangement pitch of the concave and convex portions of the fingerprint of the finger.

Here, the arrangement pitch of the light receiving portions 20 is defined as the interval d1 between the centers of the adjacent light receiving portions 20, as shown in FIG. 1. In the solid-state imaging device 1 shown in FIG. 1, the arrangement pitch of the light receiving portions 20 is constant, and hence the interval d1 is, as it is, the "average arrangement pitch of the light receiving portions 20". In the case where, on the contrary, the arrangement pitch is not constant, an average of them is employed as the "average pattern pitch of the light receiving portions 20".

Figure 2:
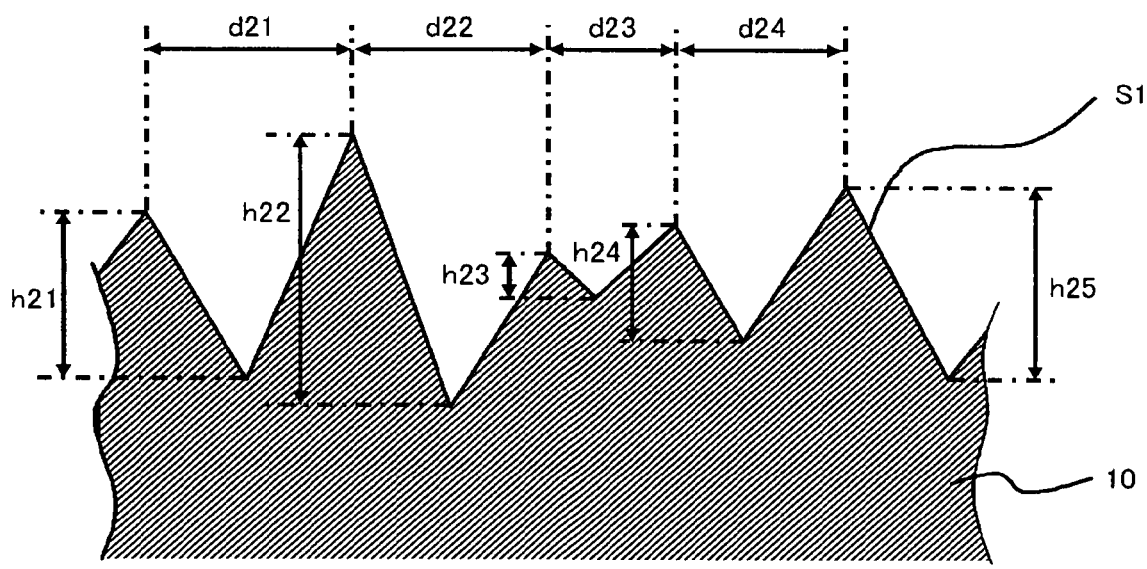
FIG. 2 is a cross-sectional view for explaining an arrangement pitch of concave and convex portions of a contact surface.

On the other hand, as shown in FIG. 2, the arrangement pitch of the concave and convex portions of the contact surface S1 is defined as intervals d21, d22, d23, d24 between the adjacent convex portions. In the case where the intervals d21, d22, d23, d24 are not constant, an average of those intervals is employed as the "average arrangement pitch of the concave and convex portions of the contact surface S1". Such value may be approx. 50 μm, for example. Also, the height of the convex portion of the contact surface S1 is defined as differences in height h21, h22, h23, h24, h25 between the convex portion and the adjacent concave portion. In the case where the differences in height h21, h22, h23, h24, h25 are not constant, an average of those differences is employed as the "average height of the convex portion of the contact surface S1". Such value may be approximately 0.1 to 10 μm, for example.

Definitions of the arrangement pitch of concave and convex portions and the height of the convex portion of the fingerprint are similar to those of the contact surface S1. Here, the arrangement pitch of the concave and convex portions of the fingerprint may be 1 mm, for example. In this case, the condition that the average arrangement pitch of the concave and convex portions of the contact surface S1 is to be ½ or smaller of the average arrangement pitch of the concave and convex portions of the fingerprint of the finger may be paraphrased as "the average arrangement pitch of the concave and convex portions of the contact surface S1 is to be 500 μm or less".

Figure 3:
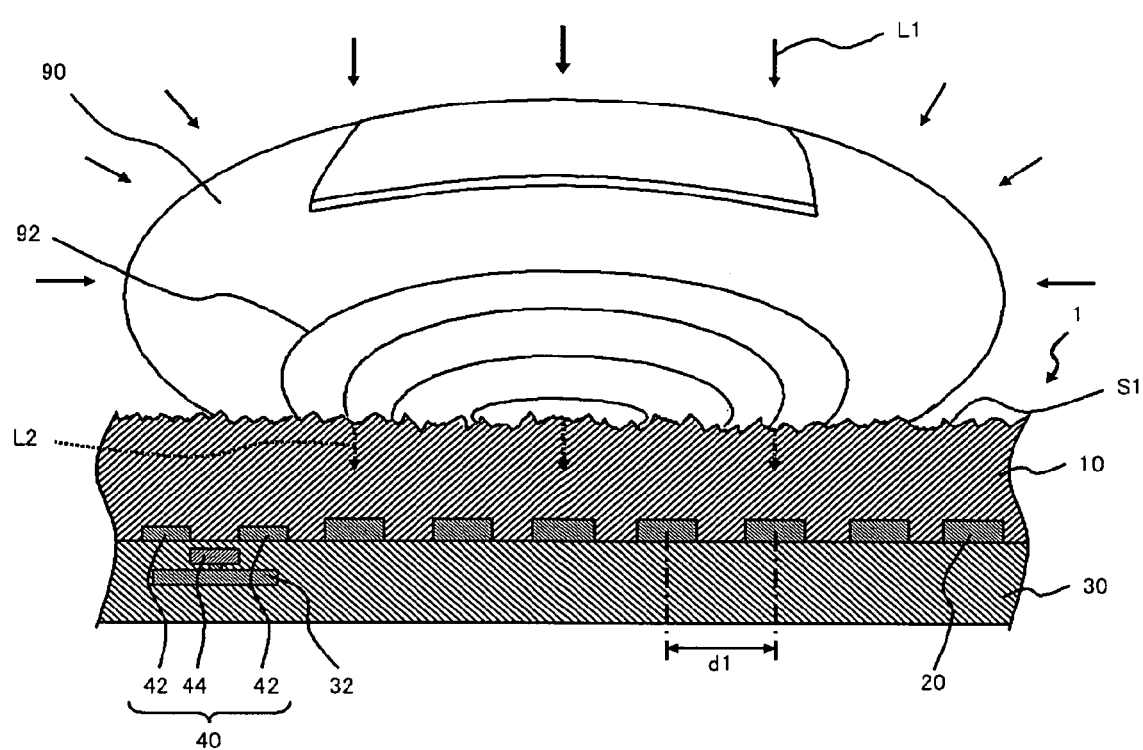
FIG. 3 is a cross-sectional view for explaining an operation of the solid-state imaging device shown in FIG. 1.

Referring to FIG. 3, an operation of the solid-state imaging device 1 will now be described. In FIG. 3, a finger 90 corresponding to the object to be imaged is brought into contact with the contact surface S1. When light L1 from a light source such as a fluorescent light or LED is incident upon the finger 90, the transmitted light L2 is made incident on the contact surface S1. Accordingly, the transmitted light L2 carries information on the shape of the fingerprint 92 of the finger 90. The transmitted light L2 is then photoelectrically converted in the semiconductor substrate 10. The light receiving portions 20 receive the signal charge generated by the photoelectric conversion, to thereby acquire an image of the fingerprint 92. Here, the light L1 may be visible light, near-infrared light or infrared light.

The foregoing embodiment offers the following advantageous effects. The solid-state imaging device 1 receives the light on the back surface. Accordingly, unlike the device of the patent document 3, the object to be imaged is kept from contacting the front surface side (the side of the interconnect layer 30) of the solid-state imaging device 1. Such configuration allows preventing breakdown of the solid-state imaging device 1, and suppressing degradation in characteristics and static breakdown. This results in upgraded reliability of the solid-state imaging device 1. For example, when the object to be imaged is a finger, since the interconnect is located on the opposite side of the finger which is charged, an excessive amount of static electricity originating from the finger can be kept from being applied to the elements (light receiving portions 20, MOSFET 40 and so on) provided in the semiconductor substrate 10.

In the solid-state imaging device 1, the contact surface S1 is a rough surface. Accordingly, after the finger, which is the object to be imaged, is brought into direct contact with the contact surface S1, the residual fingerprint barely remains on the contact surface S1, unlike in the case where the contact surface S1 is smooth. Also, the rough surface of the contact surface S1 makes it difficult to recognize the residual fingerprint with naked eyes, thereby alleviating the uneasy sensation of the user based on the fear that his/her fingerprint might be illegitimately acquired. Further, performing a surface treatment process, such as mechanical polishing, for roughening the contact surface incurs distortion on the contact surface S1 due to the mechanical processing, which may offer an EG effect of capturing a metal or the like. The EG effect may, for example, prevent a metal or the like stuck to the finger from diffusing the semiconductor substrate 10, and from thereby degrading performance of the light receiving portion 20 and the MOSFET 40 provided on the opposite side.

In the case of employing near-infrared light or infrared light as the light L1 (See FIG. 3) instead of visible light, the transmitted light L2 reaches a position deeper in the contact surface S1 than with the visible light. Employing such light, accordingly, facilitates the signal charge generated from the photoelectric conversion of the transmitted light L2 to reach the light receiving portions 20.

Also, when the average arrangement pitch of the concave and convex portions of the contact surface S1 is smaller than the average arrangement pitch of the concave and convex portions of the fingerprint of the finger, it becomes more difficult to recognize the residual fingerprint remaining on the contact surface S1 with naked eyes. Especially, when the average arrangement pitch of the concave and convex portions of the contact surface S1 is ½ or smaller of the average arrangement pitch of the concave and convex portions of the fingerprint of the finger, it becomes still more difficult to recognize the residual fingerprint remaining on the contact surface S1 with naked eyes. This also applies when the average arrangement pitch of the concave and convex portions of the contact surface S1 is 500 µm or less.

When the average height of the convex portion of the contact surface S1 is lower than the average height of the convex portion of the fingerprint of the finger, a gap is less prone to appear between the finger and the contact surface S1 when shooting the image. Such configuration, therefore, allows achieving the foregoing effect of keeping the residual fingerprint from being recognized with naked eyes, without compromising in imaging quality.

When the average arrangement pitch of the concave and convex portions of the contact surface S1 is smaller than the average arrangement pitch of the light receiving portions 20, it becomes more difficult to recognize the residual fingerprint remaining on the contact surface S1 with naked eyes. Also, when the average arrangement pitch of the light receiving portions 20 is smaller than the average arrangement pitch of the concave and convex portions of the fingerprint of the finger, the fingerprint image can be acquired with sufficiently high resolution.

In the solid-state imaging devices according to the patent documents 1 to 4, on the contrary, the contact surface is planarized (gloss-finished), which makes it easy to recognize the residual fingerprint remaining on the contact surface with naked eyes. This originates in the user an uneasy sensation that the fingerprint data might be acquired while his/her finger is not in contact with the contact surface.

To minimize the foregoing problem, the solid-state imaging device according to the patent document 1 is granted with a function of distinguishing the residual fingerprint based on the movement amount of the fingerprint image, to thereby secure solid protection against the illegitimate acquisition of the residual fingerprint. Incorporating such function, however, not only complicates the structure of the solid-state imaging device, but also raises the cost thereof.

The patent document 4 discloses a total-reflection type solid-state imaging device including an internal light source that illuminates the contact surface, to thereby acquire a fingerprint image based on the reflected light. The total-reflection type solid-state imaging device has, however, drawbacks such as incurring supersaturation and halation. On the other hand, the solid-state imaging device 1 utilizes the light transmitted through the object to be imaged, and is hence free from such drawbacks.

Also, the patent document 5 discloses a scattering type solid-state imaging device that includes a contact surface with concave and convex portions formed thereon, as improvement of the total-reflection type solid-state imaging device. This solid-state imaging device detects the scattering light on the contact surface, unlike the solid-state imaging device 1 which detects the light transmitted through the object to be imaged. For this purpose, the solid-state imaging device according to the patent document 5 is additionally provided with a transparent material with concave and convex portions on its surface for light-scattering, a lens, and an input apparatus. Such solid-state imaging device naturally incurs an increase in the number of manufacturing steps, as well as in dimensions and cost of the solid-state imaging device.

Further, the patent document 6 discloses a solid-state imaging device that includes a contact surface with concave and convex portions formed thereon. This solid-state imaging device also detects the scattering light on the contact surface, unlike the solid-state imaging device 1 which detects the light transmitted through the object to be imaged. Accordingly, in the solid-state imaging device according to the patent document 6, an optical device for detecting concave and convex portions, having a scattering surface with concave and convex portions formed thereon, includes a plurality of ribs (protruding portions) having a semicircular cross-section formed in an upper portion of a transparent layer made of an acrylic resin or glass, and located on a two-dimensional photosensor. The ribs having the semicircular cross-section are of the same shape and regularly aligned. Such structure requires an increase in the number of manufacturing steps and higher precision in processing, which naturally leads to an increase in cost of the solid-state imaging device.

Still further, the patent document 7 also discloses a scattering type solid-state imaging device. The solid-state imaging device according to this document includes a contact surface on which the finger is to be placed, in addition to the scattering surface with concave and convex portions formed thereon. The contact surface is smoothly finished, and hence prone to retain the residual fingerprint. Besides, this solid-state imaging device includes an intermediate layer made of a gas or fluid between the scattering surface and the contact surface. Such structure inevitably leads to an increase in the number of manufacturing steps, and hence in cost of the solid-state imaging device.

The solid-state imaging device according to the present invention is not limited to the foregoing embodiment, but various modifications may be made. To cite a few examples, although the solid-state imaging device according to the embodiment includes the N-channel MOSFET (MOSFET 40 shown in FIG. 1), a P-channel MOSFET may further be provided. Also, while the solid-state imaging device according to the embodiment includes the P-type semiconductor substrate and the N-type light receiving portions, the semiconductor substrate may be of N-type and the light receiving portions may be of P-type. Further, the present invention may also be applied to a solid-state imaging device of a charge-coupled device (CCD) type.

Figure 4:
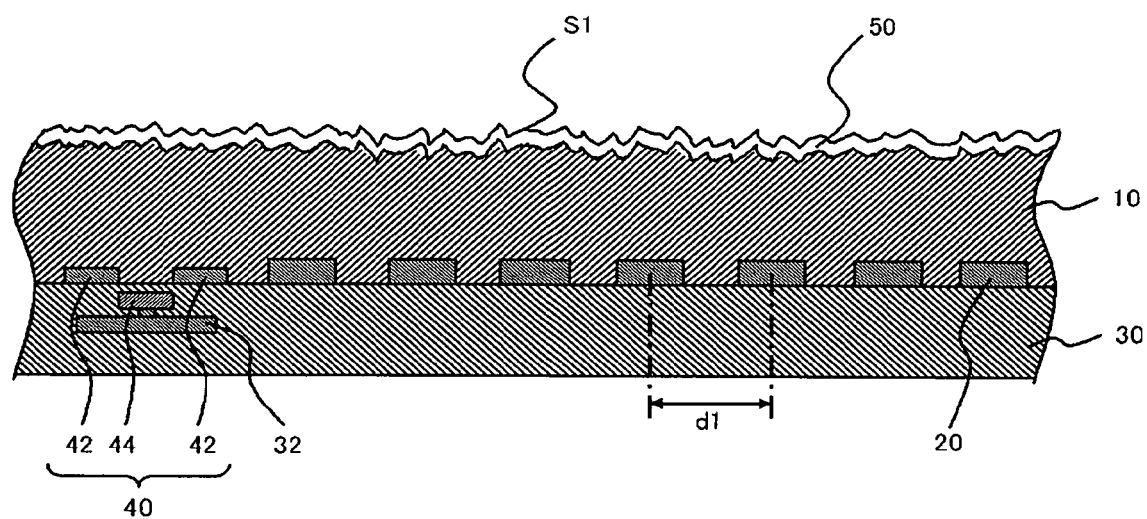
FIG. 4 is a cross-sectional view of a variation of the solid-state imaging device according to the embodiment.

Still further, although the contact surface S1 is provided on the back surface of the semiconductor substrate 10 in the embodiment, a cover layer 50 may be provided on the back surface of the semiconductor substrate 10, and the contact surface S1 may be provided on the cover layer 50, as shown in FIG. 4. In FIG. 4, the back surface of the semiconductor substrate 10 is roughly finished, and accordingly the surface of the cover layer 50 formed thereon is also rough. Providing thus the cover layer 50 further assures the prevention of diffusion of the semiconductor substrate 10 due to impurity stuck to the finger, and the resultant degradation in performance of the light receiving portions 20 and the MOSFET 40. The cover layer 50 may be formed of SiO, SiN or SiON. The cover layer 50 may have a thickness of, for instance, approximately 0.3 µm. Forming the cover layer 50 as thin as approximately 0.3 µm, so as to make it thinner than the wavelength of the incident light, allows minimizing the influence to the imaging quality.

It is apparent that the present invention is not limited to the above embodiment, and may be modified and changed without departing from the scope and spirit of the invention.

What is claimed is:

1. A solid-state imaging device, comprising:
   a semiconductor substrate;
   a light receiving portion in said semiconductor substrate; and a cover layer on a back surface of said semiconductor substrate, wherein a surface of the cover layer facing opposite the semiconductor substrate forms a contact surface with which an object to be imaged is brought into contact, wherein said back surface of said semiconductor substrate and said contact surface are rough surfaces, wherein said cover layer is formed of one of SiO, SiN, and SiON, and wherein light transmitted through said object to be imaged in contact with said contact surface is photoelectrically converted in said semiconductor substrate, so that said light receiving portion receives an electric charge generated by said photoelectric conversion, thereby acquiring an image of said object to be imaged.

2. The solid-state imaging device according to claim 1,
wherein said object to be imaged is a finger,
wherein said contact surface has a concave portion and a convex portion arranged alternately, and
wherein an average arrangement pitch of said concave and convex portions of said contact surface is smaller than an average arrangement pitch of concave and convex portions of a fingerprint of said finger.

3. The solid-state imaging device according to claim 2,
wherein said average arrangement pitch of said concave and convex portions of said contact surface is ½ or smaller of said average arrangement pitch of said concave and convex portions of said fingerprint of said finger.

4. The solid-state imaging device according to claim 2,
wherein said average arrangement pitch of said concave and convex portions of said contact surface is 500 μm or less.

5. The solid-state imaging device according to claim 2,
wherein an average height of said convex portion of said contact surface is lower than an average height of said convex portion of said fingerprint of said finger.

6. The solid-state imaging device according to claim 2,
wherein the semiconductor substrate comprises a plurality of said light receiving portions, and
wherein said average arrangement pitch of said concave and convex portions of said contact surface is smaller than an average arrangement pitch of said light receiving portions.

7. The solid-state imaging device according to claim 6,
wherein said average arrangement pitch of said light receiving portions is smaller than said average arrangement pitch of said concave and convex portions of said fingerprint of said finger.

8. The solid-state imaging device according to claim 2,
wherein said concave and convex portions of said contact surface include distortion originating from processing.

9. The solid-state imaging device according to claim 1,
wherein the cover layer has a thickness of approximately 0.3 μm.

10. The solid-state imaging device according to claim 9,
wherein a roughness of the contact surface corresponds to the roughness of the back surface.

11. The solid-state imaging device according to claim 1,
wherein the contact surface has concave portions and convex portions arranged alternately, and
wherein an average height of the convex portions of the contact surface is between 0.1 μm and 10 μm, and an average arrangement pitch of the concave and convex portions of the contact surface is approximately 50 μm.

* * * * *